May 13, 1958     G. V. A. MALMROS ET AL     2,834,919
SYNCHRONIZING SYSTEM
Filed Feb. 24, 1954                                        5 Sheets-Sheet 3

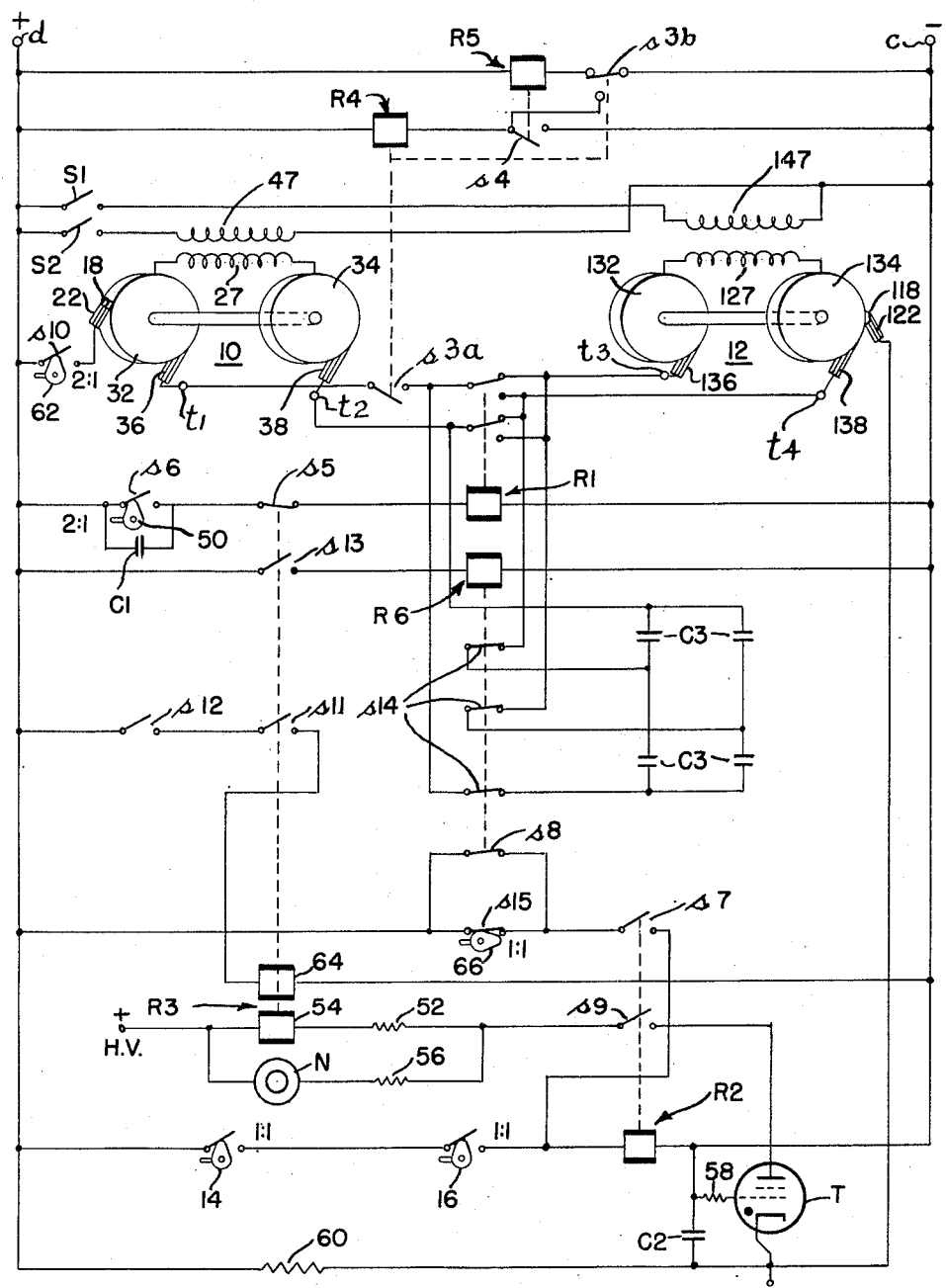

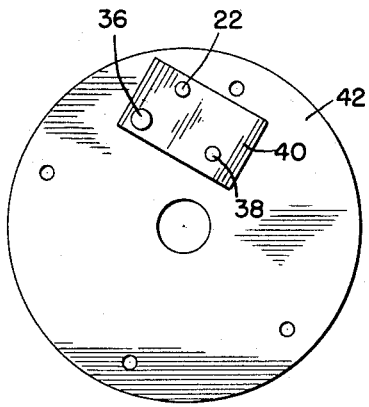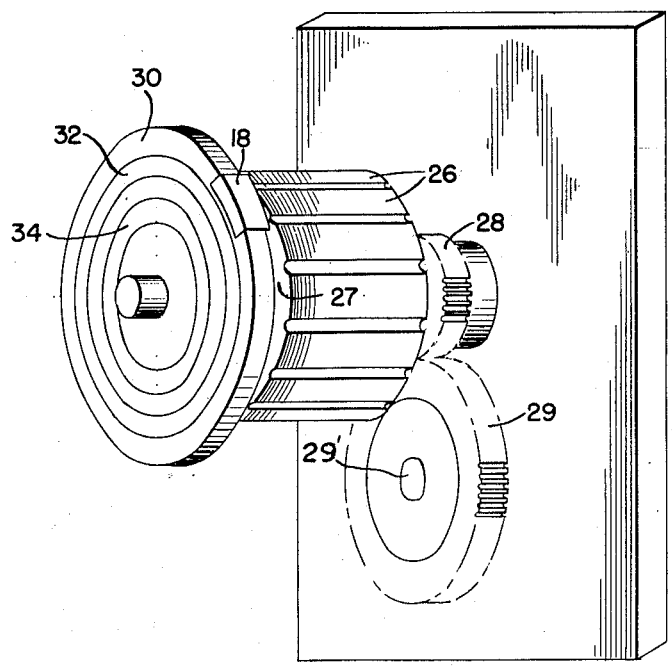

INVENTORS
Gustav V. A. Malmros
BY Donald K. Rex
Davis, Hoxie & Faithfull
ATTORNEYS

United States Patent Office 2,834,919
Patented May 13, 1958

2,834,919

SYNCHRONIZING SYSTEM

Gustav V. A. Malmros, Binghamton, and Donald K. Rex, Endicott, N. Y., assignors to International Business Machines Corporation, New York, N. Y., a corporation of New York Application February 24, 1954, Serial No. 412,213

25 Claims. (Cl. 317—6)

This invention relates to a synchronizing system, and more particularly to a system for synchronizing both the rotational speed and the phase relationship between the shafts of independently driven machines.

Although the shafts of two or more machines are commonly caused to rotate at the same speed or a multiple thereof by means of synchronous motors which are connected to the same power supply, such a system, while enjoying the undisputed advantage of simplicity, has several inherent disadvantages. For many applications, synchronous motors are not desirable as they operate at a constant speed determined by the frequency of the power supply. A synchronous motor drive also is not applicable for the synchronizing of belt driven machines wherein any variation in the slippage of the belts will result in a corresponding change in the machine speed. Furthermore, while machines driven by synchronous motors will operate at the same electrical speed, there is no point-to-point correlation between the relative positions of the rotors so that the machines are not started simultaneously, or if, due to some disturbance, one rotor slips one or more poles the relative mechanical phase angle between the rotors is changed. In some applications, where it is only required that the shafts of the driven machines operate at the same rotational speed, a change in the mechanical phase angle between the rotors of the driving motors is immaterial, but in many other applications, particularly those wherein the operations of the driven machines are to be performed in sequence or simultaneously, it is necessary that there be no variation in the relative position of machine shafts as they are operated at synchronous speed; or, stated in other words, as the shafts revolve at the same speed, ideally, corresponding points on the shafts should at any instant have the same relative positions.

This ideal condition is not obtainable because the maximum transfer of energy between two alternators takes place when they are displaced 90 electrical degrees from one another which determines the accuracy of the system, and although it is possible to reduce the angular displacement error by increasing the size of the alternators and operating them with a reduced output, such a system is inherently uneconomical as doubling the size of the generator results in a reduction of the error by approximately fifty percent so that it is unfeasible to obtain close control in this manner. Alternatively, the displacement error may be reduced by interposing gear units between the driven machine shafts and the respective alternators so that the speeds of the alternator rotors are increased by a factor numerically equal to the gear ratio, and the angular displacement error therebetween reduced by a factor which is equal to the reciprocal of the gear ratio. Although the shaft displacement error is reduced by a gear unit, such system without further refinements is of necessity limited to slow speeds and comparatively large displacement errors. As will be readily apparent by the consideration of the example of two driven machines whose shafts are to be driven from separate power sources at the comparatively moderate rate of 500 R. P. M. and two interconnected alternators are directly coupled to the respective shafts, if the maximum power transfer between the alternators is such as to cause a rotor displacement of 90 electrical degrees to maintain the driven machine shafts in synchronism, to reduce the displacement error to 9 electrical degrees it is necessary to interpose gear units between the alternators and driven machine shafts which will step up the alternator speeds to 5000 R. P. M. If the error is to be reduced to 0.9 of an electrical degree, the alternator speed must again be increased tenfold to 50,000 R. P. M.; and it will be evident that to obtain even reasonably accurate control the operation of the alternators must be at such high speeds that the noise level is objectionably high and the bearing life is short.

It is accordingly the principal objects of this invention to provide a synchronizing system which will operate the shafts of two driven machines at the same speed, which will maintain a constant mechanical phase relationship between the shafts, which does not require that the synchronized driven machines be energized from the same power supply, which does not require any mechanical interconnection between the driven machines, which permits the synchronized speed of the driven machines to be varied, which indicates when the machines are in synchronism, which can be used with belt driven machines, which is simple and reliable in operation, and which advances the art generally.

According to the present invention the synchronizing system comprises two electrodynamic machines which are preferably multipole generators. Each of the generators is mechanically connected either directly or through a suitable non-slipping drive such as a gear train, to the shaft of a respective independently driven machine whose rotational speed is to be synchronized with the shaft of another driven machine which is coupled in a similar manner to the other generator. The output terminals of the generators are interconnected by an electrical circuit so that electrical power is transferred, from the generator coupled to the machine which is operating at the greater rotational speed, to the other generator, which being driven, acts as a motor to feed mechanical power into the shaft of the slower driven machine, thus equalizing the rotational speed of the shafts of the two machines. The interconnecting circuit is provided with switching means, such as a transfer or reversing relay, whose contacts periodically operate to reverse sequentially the relative polarity of the interconnection between the output of the generators so that the generator receiving electrical power drops back 180 electrical degrees with respect to the other generator upon each reversal of polarity by the action of the contacts of the transfer relay. The reversing action of the transfer relay is interrupted by control means when the generator rotors are operating at the same rotational speed with no relative mechanical phase difference therebetween. The control means includes means for first giving a rough check to determine if the generator rotors are approximately in the desired mechanical phase relationship and further means operable after the rough check has been completed to determine when the rotors are in the exact required phase relationship. The rough check means preferably includes two switches each of which is closed periodically by a cam operated by the driven shaft of a respective machine, the cams being arranged so that the overlapping of the closing period of the two switches is a rough check of the mechanical phase relationship of the shafts of the two machines. To bring the machines into their final synchronism and phase relationship the further means includes a voltage sensitive device, such as a gaseous discharge tube, whose operation is controlled by a circuit which is periodically completed through special timing lugs connected respectively with one slip ring of each generator and the interconnection between the generators, when the generators are in synchronism and in the desired mechanical phase relationship.

These and other objects and aspects of the invention will be apparent from the following description of a specific embodiment which refers to drawings wherein:

Fig. 1 is an electrical wiring diagram of the system;

Fig. 2 is an isometric view of the rotor of one of the generators showing the slip rings and the timing lug;

Fig. 3 is an end view of the generator end plate carrying the slip ring and timing lug brushes;

Figure 4:
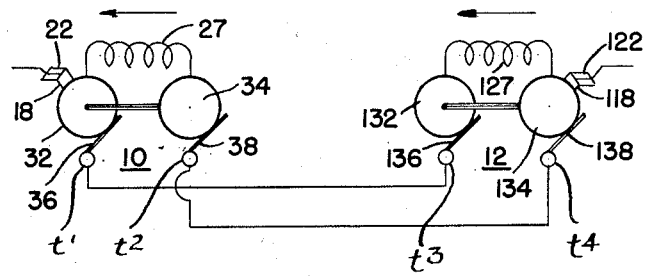
Fig. 4 is a simplified wiring diagram showing the equivalent circuit interconnecting the generators when the transfer relay is deenergized.

For purposes of illustration, the synchronizing system will be described as used to synchronize the operation of two tabulating machines so that the information recorded upon perforated cards fed into the controlled or "Slave" machine will energize the print magnets of the print unit of the controlling or "Master" machine to print the information upon a record sheet, although it is to be understood that the invention is not so limited but can be used generally to synchronize the rotational speed and relative phase relationship of the shafts of two or more independently driven machines or two or more independently driven units within the same machine. A tabulating machine of the above mentioned type is commonly operated by a self-contained electric motor through a mechanical drive which includes a belt, a clutch and a reduction gear whch operate the main shaft of the machine at approximately 80 R. P. M. Because of belt slippage, random engagement of the clutch and the desirability of using a non-synchronous type of driving motor it is necessary, if the operations of more than one machine are to be correlated, not only that the main shafts of the machines be rotated at the same speed but that the relative point-to-point relationship or mechanical phase between the shafts be the same.

We have found it possible to obtain such synchronization of the shaft speed and mechanical phase relationship by coupling the shaft of a rotor of a synchronous generator 10 to the main shaft 29' of one of the machines by means of a non-slipping mechanical drive gear unit such as is shown in Fig. 2. The diameters of the gears 28 and 29 are proportioned so that the overall step-up ratio including the gearing within the driven machine is 20:1, i. e., with a main shaft speed of 80 R. P. M. the generator rotor speed is 1600 R. P. M. A second synchronous generator 12 is coupled by a similar step-up gear unit to the main shaft of the other machine in an analogous manner. The rotors of the generators are interconnected by slip rings and a circuit including the relative polarity reversing contacts of a transfer relay R1 whose function will be described in detail below.

The speed of the driving motor of one machine is adjusted so that in the absence of an electrical interconnection between the generators 10 and 12, the main shaft of this machine will rotate at a slightly greater speed than the main shaft of the second machine. For purposes of distinguishing between the machines and their associated generators in the following discussion, the generator 10 and coupled machine will be assumed to be driven at the slightly greater speed and designated as the "Master" generator and machine. The designation "Slave" is employed for the slower generator 12 and associated machine. Therefore, when an interconnecting electric circuit is established between the rotors of the two generators 10 and 12, the "Master" generator 10 is trying to run at a greater rate of speed causing electrical energy to be transferred through the interconnecting circuit to drive the "Slave" generator 12 as a motor. According to the well known principles governing the operation of synchronous apparatus, the amount of electrical power taken from the "Master" generator 10 and fed into the "Slave" generator 12 will be that required to maintain the speed of the "Slave" generator rotor at the same speed as that of the "Master" generator rotor so that the rotational speeds of the shafts of the coupled machines are equalized. As such power transfer takes place the driven "Slave" generator rotor drops behind the driving "Master" generator by an angular displacement of 90 electrical degrees or less, the magnitude of the displacement being determined by the load upon the "Slave" generator and of its output size. The angular displacement between the shafts of the driven machines is 1/20 as great as between the generator rotors, and the displacement error is further reduced by using a multipole generator having more than two poles and preferably a comparatively large number of poles, e. g. 16 or 24, so that each electrical degree of angular displacement results in only 1/8 or 1/12 of a degree of mechanical displacement of the generator rotors which with a a 20:1 gear ratio corresponds to 1/160 or 1/240 degree displacement of the driven machine shafts.

Figure 5:
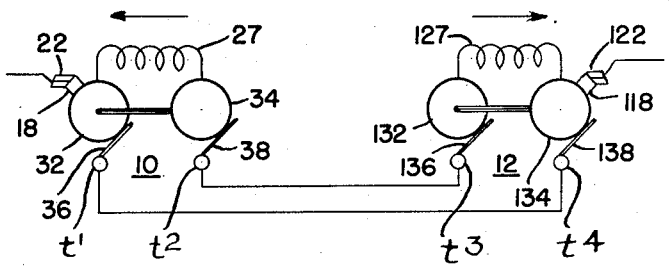
Fig. 5 is a simplified wiring diagram showing the equivalent circuit interconnecting the generators when the transfer relay is energized.

The desired mechanical phase relationship between the machine shafts is obtained by the periodic transferring of the contacts of the transfer relay R1 which are arranged in one position to connect the output terminals of one generator with the corresponding output terminals of the other generator so that the interconnection is the equivalent of that shown in Fig. 4; and in their other position to reverse the interconnection of the generator output terminals so that the interconnection is the equivalent of that shown in Fig. 5. A comparison of the circuits of Figs. 4 and 5 will reveal that each time the transfer relay solenoid is energized or deenergized to transfer the contacts there is a relative reversal of the polarity of the interconnection between the output terminals of the generators and therefore of their rotors which causes the "Slave" generator 12 to drop back one pole or 180 electrical degrees with respect to the "Master" generator 10. When the main shafts of the driven machines are brought into the desired mechanical phase relationship wherein the shafts are rotating at the same speed and in the same point-to-point relationship, the operation of the transfer relay R1 is interrupted so that the "Slave" generator no longer drops back and generator rotors and coupled main shafts then rotate at the same speed without further appreciable changes in their relative angular relationship.

The determination of the mechanical phase relationship between the shafts of the machines is made in two steps. The first rough check is made by two rough check cams 14 and 16 (Fig. 1) which are driven respectively by the main shafts of the "Master" and "Slave" machines so that once during each revolution of the shafts the contacts of corresponding switches are closed by the respective cams. The dwell of the rough check cams 14 and 16 is made such that when the shafts are within 14 mechanical degrees of being in the desired mechanical phase relationship the closed periods of the switches overlap and a circuit is completed which energizes a rough check relay R2. This circuit applies a potential to the anode of a gaseous discharge device such as the tube T which is of the thyratron type so that the tube is conditioned to conduct when a positive voltage is applied to its control electrode.

The final close check for the desired mechanical phasing is made by means of two conducting members, such as the projecting timing lugs 18 and 118, which rotate conjointly with the rotors of the "Master" and "Slave" generators so as to make electrical contact with corresponding stationary members such as brushes 22 and 122 once during each revolution of the respective rotors. The lugs 18 and 118 are so positioned as simultaneously to make contact with their respective brushes 22 and 122 when the main shafts are in the desired mechanical phase relationship. The timing lug 18 is connected with one of the slip rings of the "Master" generator 10 and the brush 22 is located so that at the instant of contact with the lug the peak of the relatively positive potential wave is applied thereto. Similarly the other timing lug 118 is connected with one of the slip rings of the "Slave" generator 12 and the brush 112 is located so that the peak of the negative potential wave is simultaneously applied to it. With the transfer relay R1 deenergized its contacts complete an interconnecting circuit between the output terminals of the generators which is the equivalent of the circuit shown in Fig. 4 so that a circuit is completed through the relay contacts whereby the positive and negative peaks are additive to provide a firing potential which is impressed upon the control electrode of the tube T. The resulting flow of current, as the tube conducts, energizes a relay R3 in the tube anode circuit which opens the circuit of the transfer relay R1 so that the dropping back of the "Slave" generator 12 is halted.

As is best shown in Figs. 2 and 3, the rotor for the "Master" generator 10 comprises a laminated core with sixteen salient poles 26 upon which are carried a series winding 27 so that adjacent poles are of opposite magnetic polarity. One end of the rotor shaft has a pinion 28 attached thereto which is one of the elements of the above mentioned step-up gear unit. The other end of the rotor shaft carries a disc 30 of an insulating material wherein are embedded two concentric conducting slip rings 32 and 34 which are connected with the ends of the rotor winding. The disc 30 also carries the timing lug 18 upon its periphery. The brush 22 which periodically contacts the lug 18 and brushes 36 and 38 which are in continuous contact with the slip rings 32 and 34 project from the inner face of an insulating block 40. The block 40 is supported in a circular end plate 42 which also carries a bearing wherein is journalled the end of the rotor shaft. The end plate 42 engages a rabbet in the end of a stator frame (not shown) wherein is carried a laminated core also having sixteen poles which are wound in series so that the stator winding 47 (Fig. 1) magnetizes adjacent poles with the opposite polarity. The "Slave" generator 12 is of similar construction, the prefix "1" being used in the designation of its corresponding elements only as a matter of convenience in the following description of the operation of the system.

The stator windings 47 and 147 (Fig. 1) are energized respectively from the terminals $d$ and $c$ of a conventional direct power source (not shown) by the closing of manually operated switches S1 and S2. Although for the purpose of simplifying the wiring diagram of Fig. 1 the stator windings are shown as energized from a common power source, it is to be understood that it is also possible and oftentimes preferable, as when the "Master" and "Slave" machines are widely separated, to use separate power sources without departing from the spirit of my invention.

As mentioned heretofore the output terminals of the "Master" and "Slave" generators are interconnected by the contacts of a transfer relay R1. In the normal deenergized position of the relay contacts which is shown in Fig. 1, output terminals $t1$ and $t2$ of the "Master" generator 10 are connected respectively with the corresponding terminals $t3$ and $t4$ of the "Slave" so that the rotor windings 27 and 127 are electrically interconnected as shown in Fig. 4. When the solenoid of the transfer relay R1 is energized by the circuit described below, the interconnection of the output terminals is reversed, the terminal $t1$ of the "Master" generator 10 then being connected to terminal $t4$ of the "Slave" generator 12 and terminal $t2$ being connected to terminal $t3$, as shown in Fig. 5. It will be evident that if the rotors of the generators are operating in synchronism with the generator output terminals interconnected as shown in Fig. 4, the energization of the transfer relay R1 reverses the relative polarity of the terminal interconnection to that shown in Fig. 5 which is equivalent to an electrical phase shift of 180 degrees, and it is necessary for the "Slave" generator 12 to drop back one pole again to bring it back into synchronism with the "Master" generator 10. As there are sixteen poles upon the generator rotors, the drop back of one pole by the rotor of the "Slave" generator 12 results in a relative shift of 22½ mechanical degrees with respect to the rotor of the "Master" generator 10; and because of the 20:1 gear ratio, an equivalent shift back of 1⅛ degrees of the main shaft of the "Slave" machine relatively to the main shaft of the "Master" machine. A similar drop back action of one pole occurs when the solenoid of the transfer relay R1 is deenergized to return the relay contacts to their normal position which again throws the generators 180 degrees out of electrical phase, i. e., each time the relay contacts are energized or deenergized the "Slave" generator 12 drops back one pole which corresponds to a mechanical phase change of 1⅛ degrees in the relative positions of the main machine shafts.

Interposed in one side of the circuit interconnecting the generator rotors is a pair of normally open interlocking contacts $s3a$ which are closed by the energization of the solenoid of a relay R4 from the power source terminals $d$ and $c$. The relay energizing circuit includes the contacts $s4$ of a time delay thermal relay R5 whose solenoid is also energized from the terminals $d$ and $c$ through the normally closed contacts $s3b$ of the relay R4. The resulting closing of the contacts $s4$ energizes the solenoid of the relay R4 so that the contacts $s3b$ are transferred to open the circuit of the solenoid of the relay R5 and concomitantly complete a holding circuit for the interlocking relay R4. If the field winding 147 of the "Slave" generator 12 is energized from a separate direct power source, a second pair of interlocking contacts is interposed in the generator interconnecting circuit and operated in a similar manner by separate interlocking and thermal delay relays (neither of which are shown) energized from the separate power source so that the generator interconnecting circuit cannot be completed without first energizing the power supply terminals $d$ and $c$ and the terminals of the separate power source.

The solenoid of transfer relay R1 is energized from the power source terminals $d$ and $c$ by means of a circuit which includes the normally closed contacts $s5$ of a relay R3 and the cam operated contacts $s6$ which are provided with a parallel connected arc-reducing capacitor C1. A drop back cam 50 is driven from the main shaft of the "Master" machine and is arranged to close the contacts $s6$ for two periods corresponding to ninety degrees of rotation and spaced at ninety degree intervals. With the contacts $s5$ closed, the circuit is completed to energize the solenoid of the transfer relay R1 twice during each revolution of the shaft. As was described above, each time the transfer relay solenoid is energized or deenergized the "Slave" generator 12 drops back one pole with respect to the "Master" generator 10 so that for each revolution of the "Master" machine main shaft the relay is energized and deenergized twice and the "Slave" generator drops back four poles which is the equivalent of 4½ degrees of mechanical phase shift between the main machine shafts. This is graphically illustrated in Fig. 7 wherein the bars 135 and 136 indicate that the contacts $s6$ are closed between the 45 to 135 and 225 to 315 degree positions of the main machine shaft.

As stated heretofore, the rough check cams 14 and 16 are driven respectively from the main shafts of the "Master" and "Slave" machines and are arranged to close their associated contacts once during each revolution of the shafts for an interval corresponding to 14 degrees of rotation of the shafts. The cams 14 and 16 are oriented with respect to the main shafts so that the closing intervals of their associated contacts overlap only after the shafts have been brought within 14 degrees of their desired mechanical phase relationship by the above described drop back action of the "Slave" generator 12. The associated contacts are closed by the cam 14 during the 198 to 212 degree position of the main shaft of the "Master" machine. When the closing intervals of the rough cam contacts overlap, a circuit is completed to energize the solenoid of the rough check relay R2 from the power source terminals d and c or from the second power source of the "Slave" machine if such is used. After being energized the relay R2 is maintained in its transferred position by a holding circuit which parallels the contacts operated by the rough check cams 14 and 16 and which includes the relay holding contacts s7 and the normally closed contacts s8 of a holding relay R6. The energizing of the rough check relay R2 also closes its contacts s9 to complete a circuit including a current limiting load resistor 52 and the operating solenoid 54 of the relay R3 so as to connect the anode of the thyratron tube T to the positive terminal H. V.+ of a conventional high voltage direct power supply (not shown). A signaling device such as the neon lamp N and a current limiting resistor 56 are connected in parallel with the resistor 52 and the solenoid 54 to give a visual indication of a current flow in the anode circuit of the tube T. The tube cathode is directly linked with the negative terminal H. V.— of the high voltage power supply.

Figure 6:
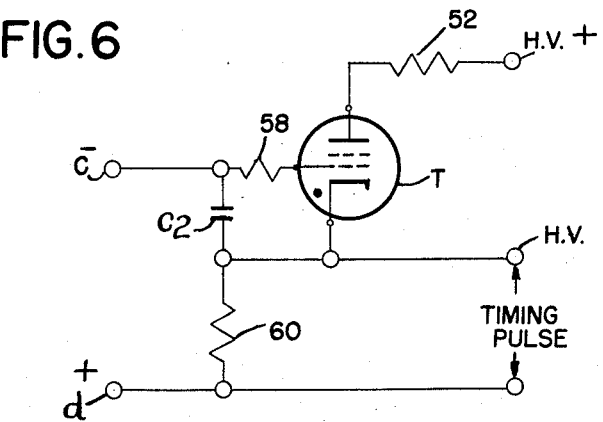
Fig. 6 is a schematic wiring diagram of the thyratron and its associated circuits.

The control electrode of the tube T is connected with the negative terminal c of the direct power source by a current limiting resistor 58. The positive terminal d of the direct power source is connected to the tube cathode through a resistor 60 so that upon the charging of a capacitor C2 which interconnects the tube control electrode and cathode the control electrode is relatively negative to bias the tube T beyond cut-off. The tube T is fired by impressing upon its control electrode a voltage which is relatively positive with respect to its cathode whereupon the tube, being gas filled, conducts heavily until its anode circuit is interrupted. As can be more readily seen from the simplified wiring diagram of the tube T (Fig. 6), the potential of the control electrode is fixed by the potential of the power source terminal c to which the electrode is connected as is the potential of the lower end of the resistor 60 which is directly linked to the terminal d. After the capacitor C2 is charged there is no voltage drop across the resistor 60 so that the tube cathode is at the potential of terminal d. If, however, a firing potential is applied to the timing pulse terminal which is of a greater magnitude than the potential of the power source terminals d and c and is of such a polarity that the IR drop across the resistor 60 causes the cathode to be more negative than the terminal d, the control electrode will be relatively more positive than the cathode by the difference between the magnitudes of the firing and power source potentials so that the tube T conducts. Such a firing potential is obtained from the above described additive instantaneous peak voltage that is developed across the timing lugs 18 and 118 of the generators 10 and 12 when the lugs simultaneously contact their brushes 22 and 122. To this end the brush 22 of the "Master" generator 10 is connected to the relatively positive end of the resistor 60 through the cam operated contacts s10 and the bus of the terminal d. The other relatively negative end of the resistor 60 is directly linked to the brush 122 of the "Slave" generator 12. The contacts s10 are closed by the check impulse cam 62, which is driven by the main shaft of the "Master" machine, twice during each revolution of the shaft for 25 degree intervals which occur during the 145 to 170 and 325 to 350 degree shaft positions. If the timing lugs 18 and 118 simultaneously make with their brushes 22 and 122 during one of the intervals when the contacts s10 are closed a circuit is completed which includes the slip ring 32 of the "Master" generator 10, the timing lug 18, the brush 22, the bus of terminal d, the resistor 60, the conductor connecting with the brush 122, the timing lug 118 and the slip ring 134 of the "Slave" generator 12. When the transfer relay R1 is energized, the slip ring 32 is directly connected to the slip ring 134 by a low resistance path which includes the brush 36, the generator terminal t1, the interlocking contacts s3a, the upper set of contacts of the transfer relay R1, the generator terminal t4 and the brush 138, i. e., the slip rings are directly connected as shown in Fig. 5, and no potential can be developed across the slip rings. With the transfer relay deenergized the "Master" generator output terminals t1 and t2 are connected to the "Slave" generator output terminals t3 and t4 so that the generators are interconnected as shown in Fig. 4. In such parallel connection the potential developed between the slip rings 32 and 134 is equal to the output voltage of the generators so that as the potential is applied across the resistor 60 by the above described circuit it acts as a firing potential for the tube T.

As described heretofore the timing lugs 18 and 118 and the brushes 22 and 122 are so positioned to make contact simultaneously when the main shafts of the machines are in the desired mechanical phase relationship and positive and negative potential peaks are developed upon the slip rings 32 and 134 respectively, so that the firing potential for the tube T is impressed across the resistor 60 only after the main shafts have been brought into the desired mechanical phase relationship.

The firing of the tube T causes a flow of current through its anode circuit to energize the solenoid 54 of the relay R3 and concomitantly cause the neon lamp N to glow. The resulting opening of the normally closed contacts s5 of the relay R3 interrupts the energizing circuit of the transfer relay R1 so that the "Slave" generator 12 no longer periodically drops back a pole but operates in synchronism with the "Master" generator 10. A pair of normally open holding contacts s11 of the relay R3 are closed by the operation of the relay R3 to complete a holding circuit for energizing an auxiliary holding solenoid 64 through a manually operated switch s12 from the terminals d and c which circuit prevents the relay contacts from dropping out when the circuit of the relay operating solenoid 54 is broken as described below. A third pair of contacts s13 of the relay R3 are also closed to energize the solenoid of the relay R6 from the power source terminals d and c. The operation of the relay R6 opens the three pair of normally closed contacts s14 which in their closed position connect the arc suppressing capacitors C3 in parallel with contacts of the transfer relay R1 in the circuit interconnecting the generator output terminals.

The normally closed contacts s8 of the relay R6 in the anode circuit of the tube T are conjointly opened so that the anode circuit is completed through a pair of normally closed contacts s15 which are connected in parallel with the contacts s8. The contacts s15 are opened momentarily by a check drop-out cam 66 which is driven by the main shaft of the "Master" machine at the 185 degree position of the shaft thereby to open the anode circuit and interrupt the flow of current through the tube T until a relatively positive firing potential is again applied to the control electrode.

It is to be noted that before the drop back action of the "Slave" generator 12 is interrupted, as described above, three conditions must be fulfilled, namely:

(1) The relative phase difference between the shafts of the "Main" and "Slave" machines must be less than 14 degrees so that the closed intervals of the contacts operated by the rough check cams 14 and 16 overlap to complete the anode circuit of the tube T;

(2) The timing lugs 18 and 118 must make contact with their associated brushes 22 and 122 during the interval the contacts s10 are closed by the check impulse cam 62; and (3) The transfer relay R1 must be deenergized so that its contacts are in their normal position to connect the generator output terminals in parallel.

Figure 7:
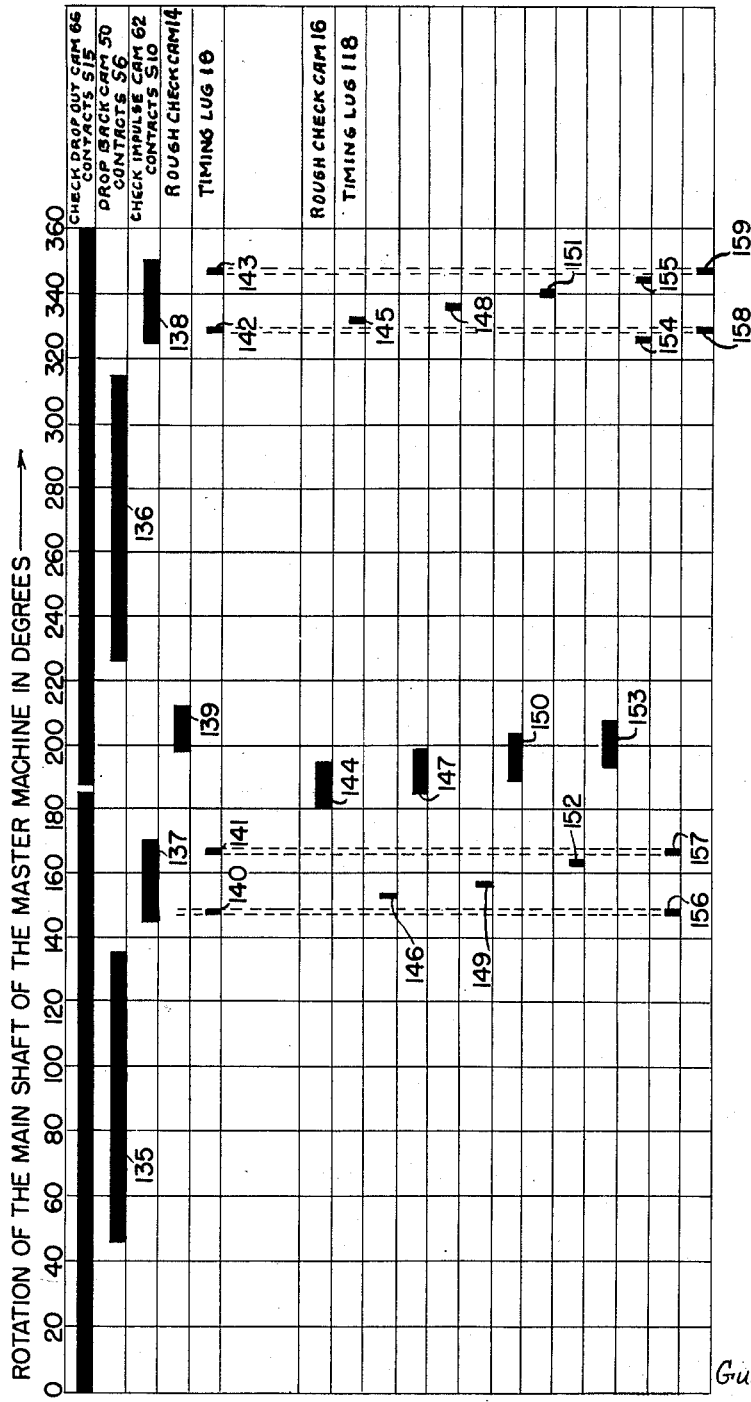
Figs. 7 and 8 are cam timing charts showing the relationship between the various cams and timing lugs.

These conditions are illustrated graphically in Fig. 7 which is a cam timing chart wherein the operation of the various cams are plotted as functions of the position of the main shaft of the "Master" machine, the bars 135, 136 indicating the intervals in terms of angle of rotation of the shaft during which the contacts associated with the various "Master" machine cams are in the closed position; immediately below are shown the positions of the "Slave" machine cams with its main shaft displaced so as to lead the main shaft of the "Master" machine by 18 degrees, i. e., the rough check cam 16 of the "Slave" machine closes its contacts at 180 degrees as indicated at 144 whereas the rough check cam 14 of the "Master" machine closes its contacts at 198 degrees as indicated at 139. As the closing intervals of the rough check cam contacts as indicated by the length of the bars 139 and 144 do not overlap, the anode circuit of the tube T cannot be completed. The drop back action of the rotor of the "Slave" generator 12 is therefore not interrupted, and as the drop back cam contacts s6 close to energize the transfer relay R1 at 225 degrees position of the main shaft of the "Master" machine as indicated by the front end of the bar 136 so that the "Slave" generator 12 drops back one pole or 1⅛ degrees of rotation of the "Master" main shaft. A similar action takes place as the relay R1 is again deenergized by the opening of the contacts s6 at the 315 degree position as indicated by the end of bar 136. A similar energizing and deenergizing of the relay R1 by the drop back cam contacts s6 takes place respectively at the 45 degree and 135 degree positions as indicated by bar 135, so that the next closing of the contacts operated by the rough check cam 16 of the "Slave" machine takes place 4½ degrees later at the 184½ degree position, as indicated by the bar 147. As the rough check cam contacts remain closed for intervals of 14 degrees, there is a ½ degree of overlapping of the intervals of the "Master" rough check cam contacts as indicated by bar 139, and the "Slave" rough check cam contacts, so that the circuit is established which energizes the solenoid of the rough check relay R2 from the power source terminals d and c. The resulting transfer of the contacts of relay R2 completes the holding circuit which includes the relay holding contacts s7 and the normally closed contacts s8. The holding circuit parallels the contacts operated by the rough check cams 14 and 16 so that the subsequent opening of such contacts does not deenergize the relay R2. Therefore once a rough check of the mechanical phase relationship of the main shafts has been made, the relay R2 remains energized and its contacts s9 remain closed to apply the anode potential to the tube T.

After the anode circuit of the tube T has been established by the completion of the rough check as described above, the final check is made by the timing lugs 18 and 118. These timing lugs engage their respective brushes 22 and 122 once during each revolution of the associated generator rotors so that an engagement occurs every 18 degrees of rotation of the coupled main shaft, but as the timing lugs can be effective to complete the firing circuit for the tube T only during the 25 degree intervals when the contacts s10 are closed by the check impulse cam 62 at the 145 and 325 degree positions of the "Master" machine shaft as indicated by bars 137 and 138, only the bars 140, 141, 142 and 143 indicating the making of contact of the timing lug 18 of the "Master" generator 10 with its brush 22 during such intervals have been included in the diagram. It will be noted that the lug 18 makes twice with its brush 22 during each time the check impulse cam 62 closes the contacts s10.

Subsequent to the closing of the contacts of the rough check cam 16 of the "Slave" machine 12 as indicated by the bar 144, the first making of the timing lug 118 with the brush 122 which occurs during the closing of the contacts s10 by the check impulse cam 62 is indicated by the bar 145 but no firing circuit can be established as there is no coincidental making of contact between the lug 18 and the brush 22 as indicated by the bars 142 and 143. No firing voltage is therefore impressed upon the control electrode of the tube T. It is to be noted that the tube T would not conduct even if there should be coincidence of the making of contact by the lugs 18 and 118 as the rough check cams 14 and 16 have not yet been effective to apply an anode potential at this point in the cycle. The subsequent making of lug 118 with brush 122 as at bar 146 is likewise ineffective to fire the tube T for the same reasons as set forth above.

Subsequent to the completion of the rough check and the completion of the anode circuit of the tube T, as indicated by the above mentioned overlapping of the closed intervals of the rough check cam contacts as indicated by the positions of the bars 147 and 139, the drop back cam 50 energizes the relay R1 as at the beginning of the bar 136 to drop the "Slave" machine main shaft back a further 1⅛ degrees so that the next making of the timing lug 118 with its brush 122 is at bar 148 which does not coincide with the making of the timing lug 18 with the brush 22 at the bar 142 or bar 143 position and the firing circuit for the tube T is not completed.

Similarly, subsequent to two further drop back steps of the "Slave" generator 12 by the drop back cam 50 as indicated by the ends of the bar 135, the next contact making of the lug 118 and the brush 122 is at bar 149 which is also ineffective because of non-coincidence with the making of the timing lug 18 and brush 22 at either bar 140 or bar 141. The contacts controlled by the rough check cam 16 of the "Slave" machine subsequently close at the beginning of bar 150 but this and the succeeding closing at bar 153 are without significance because the rough check relay R1 is being continuously energized through the above described holding circuit. Similarly, the making of contact between the lug 118 and the brush 122 which follows each succeeding drop back of the "Slave" generator 12 as indicated at bars 151, 152 and 154, is likewise ineffective to complete the firing circuit for the tube T because of lack of coincidence with the making of the lug 18 and its brush 22 as indicated at bars 140, 141, 142 or 143, as is also the case at bar 155 which indicated a second contact making of the lug 118 and brush 122 during the closed interval 138 of the contacts s10 of the check impulse cam 62.

Following the making of the lug 118 with brush 122 at bar 155, and the double drop back of the "Slave" generator 12 at bar 135, the lug 118 again makes contact with the brush 122 as at bar 156 which contact is coincident with the making of the lug 18 with its brush 22 at bar 140. Such coincidence of the timing lug action takes place during the closure of the contacts s10 by the check impulse cam 62 as indicated by bar 137 so that the heretofore described firing circuit is established to impress a relatively positive potential upon the control electrode of the tube T. The firing circuit is again established by simultaneous making of the timing lugs 18 and 118 with their brushes as indicated by the coincidence of bars 141 and 157 so that firing of the tube T is insured if for any reason it failed to conduct when the former firing circuit was established.

In either case the flow of current through the anode circuit of the tube T energizes the operating solenoid 54 of the relay R3 to open the contacts s5 thereby to interrupt the energizing circuit of the transfer relay R1. Such interruption halts the dropping back of the "Slave" generator 12 as described heretofore so that the "Master" and "Slave" generators 10 and 12 and the main shafts of the machines coupled thereto continue to rotate at the same speed and in the predetermined desired mechanical phase relationship.

The operation of relay R3 also closes contacts s13 to energize the relay R6 opening its normally closed contacts s8 and s14 which disconnect the capacitors c3 from the circuit interconnecting the generators. Upon the opening of contacts s8, the holding circuit of the relay R2 is then completed through the cam operated contacts s15. As indicated in the diagram of Fig. 7, the contacts s15 are normally closed and are only opened momentarily during each revolution of the "Master" machine main shaft at the 185 degree position by the check drop out cam 66. The resulting momentary opening of the holding circuit causes the relay R2 to drop out. The opening of the relay contacts s9 interrupts the flow of current through the anode circuit of the tube T so that the operating solenoid 54 of the relay R3 is deenergized. This does not affect the position of the contacts of the relay R3 as they are held in by the auxiliary holding solenoid 64 which is energized from the power source terminals d and c through the holding contacts s11 and the manually operated switch s12. The opening of the contacts s9, however, interrupts the flow of current through the neon lamp N, which is connected in the anode circuit in parallel with the relay operating solenoid 54, so that the lamp is extinguished as the rough check relay R2 is deenergized.

If the generators 10 and 12 are still in the desired relative mechanical phase relationship as the 198 degree position of the "Master" machine main shaft is reached, the closing of the contacts operated by rough check cams 14 and 16 will coincide so that the relay R2 again is energized to apply a high voltage potential to the anode of the tube T. The tube, however, does not conduct until a firing potential is again applied to its control electrode which ordinarily occurs if there has not been a disturbance causing the loss of synchronism during the interval the main shaft of the "Master" machine is rotating from the 185 to 330 degree position whereupon the timing lug 118 contacts its brush 122 simultaneously with the contacting of the lug 18 with its brush 22 as indicated by coincidence at bars 142 and 158, and again by the coincidence at bars 143 and 159. As the tube T conducts, the neon lamp N is again illuminated until the contacts s15 are again opened by the cam 66 during the next revolution of the main shaft of the "Master" machine.

Figure 8:
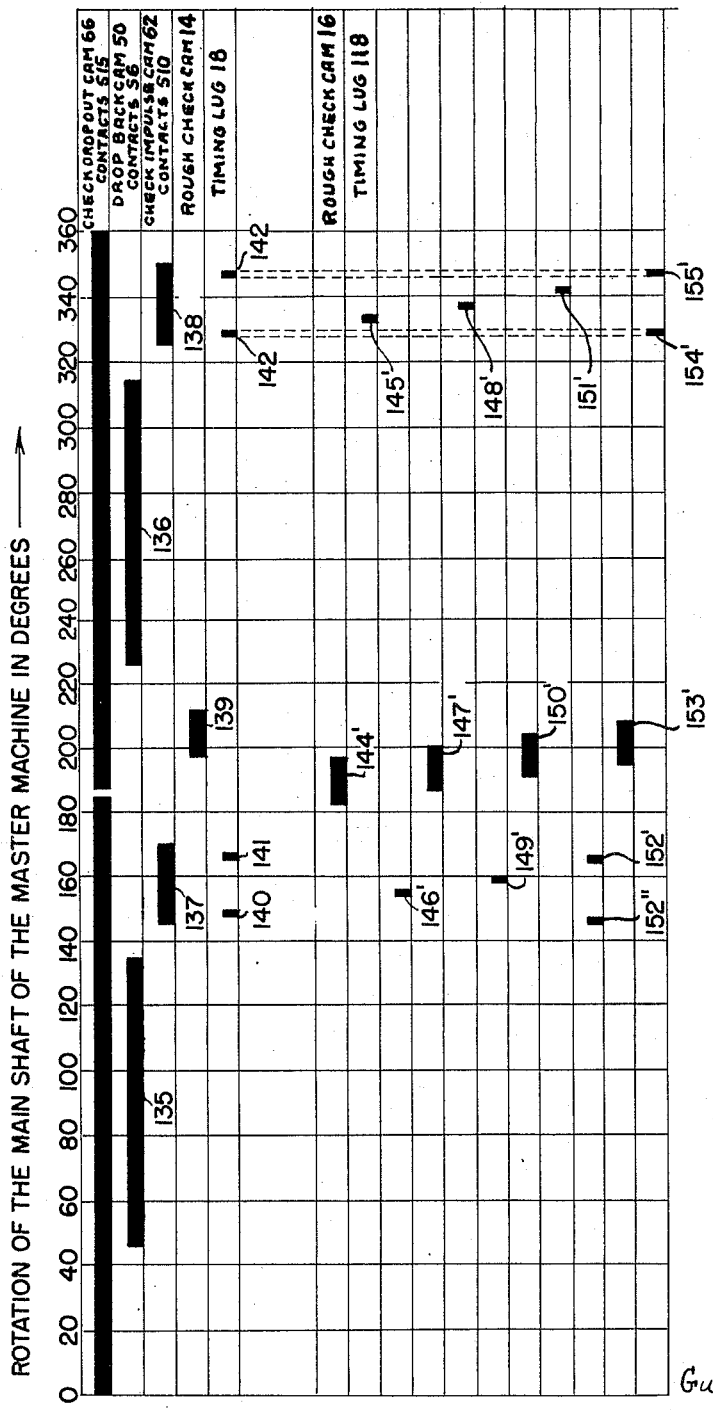

In Fig. 8 is illustrated a cam chart of a second example of the operation of the system where the main shaft of the "Slave" machine is displaced 15¾ degrees in phase relationship from the main shaft. The closing periods of the cams associated with the "Master" machine are again in Fig. 8 indicated by bars bearing the same numerals as the corresponding bars in Fig. 7. Because of the variation in the initial position of the "Slave" machine main shaft, the closing of the contacts of the rough check cam 16 and the timing lug 118 with its brush 122 take place 2¼ degrees later which is indicated by a prime on the identifying numerals for the various bars. Accordingly, the first closing of the "Slave" machine rough cam contacts is at the 182¼ degree position as indicated by bar 144'. The drop back action resulting from the action of the cam 50 is similar to that described above, there being an overlap of the closing of the contacts of the "Slave" machine rough check cam with that of the contacts of the "Master" machine rough check cam 14 as indicated by the coincidence of bars 147' and 139 to establish the anode circuit of the tube T. The simultaneous making of contact by the timing lugs 18 and 118 with their respective brushes 22 and 122 does not take place until bar 154' coincides with 142. It is to be noted that in this instance the initial establishment of the tube firing circuit takes place during the second closing of the check impulse cam 62 at 138 rather than during the first closing at 137 as in the previous example. This difference results from the different initial displacement of the "Slave" machine main shaft with respect to that of the "Master" machine. In either example the resulting voltage is impressed upon the tube control electrode and the tube T again conducts to illuminate the neon lamp N until the anode circuit is again interrupted by the opening of the contacts s15 by the drop check out cam 66 at the 185 degree position so that the neon lamp continues alternately to flash on and off as long as the machines remain in synchronism. If for any reason such as an overload the synchronism should be lost, the necessary conditions for the firing of the tube T, after the opening of its anode circuit by the operation of the check drop out cam 66, are not present and the neon lamp remains out as a signal to the operator. After the operator has determined the trouble, the drop back action of the "Slave" generator 12 is again started by the opening of the manually operated switch s12 which deenergizes the auxiliary holding solenoid 64 of the relay R3 so that its contacts s5 close to reestablish the energizing circuit for the transfer relay R1.

We claim:

1. A system for synchronizing the operation of two independently driven machines comprising two synchronous generators each of which is coupled to a respective machine so that the generator rotational speed is proportional to that of the coupled machine, an electrical circuit interconnecting the output terminals of the generators so that electrical power is transferred therebetween to equalize the rotational speed of the generators, the circuit including switching means for sequentially reversing the relative polarity of the interconnection between the generator output terminals so that the generator into which electrical power is being transferred drops back 180 electrical degrees with respect to the other generator during each reversal by the switching means, and control means for rendering the switching means inoperative in response to rotation of the generators at the same speed with no relative mechanical phase difference therebetween.

2. A system for synchronizing the operation of two independently driven machines according to claim 1 wherein each of the synchronous generators is of the multipole type having more than two poles.

3. A system for synchronizing the operation of two independently driven machines according to claim 2 wherein each of the synchronous generators has at least sixteen poles.

4. A system for synchronizing the operation of two independently driven machines according to claim 2 wherein a gear unit is provided to couple each generator to a respective machine, the gear ratio of the units being such that the generator rotates at a greater speed than the associated driven machine.

5. A system for synchronizing the operation of two independently driven machines according to claim 1 wherein the control means includes a voltage responsive device which is operative to interrupt the reversal of the polarity of the interconnection between the output terminals of the generators, the device being periodically connected with the output terminals of the generators to impress an actuating voltage upon the device when there is no relative mechanical phase difference between the generators.

6. A system for synchronizing the operation of two independently driven machines according to claim 5 wherein the switching means include an operating solenoid and contacts operable to reverse the relative polarity of the generator output terminals upon either the energizing or deenergizing of said operating solenoid, and the voltage responsive device is a gaseous discharge tube whose anode circuit controls the operation of the switching means.

7. A system for synchronizing the operation of two independently driven machines according to claim 6 wherein is further provided a drop back cam driven by one of the machines, and a pair of contacts closed periodically by the cam, the contacts being connected in the energizing circuit of the reversing relay so that the relay contacts are transferred each time the pair of contacts are opened or closed by the cam.

8. A system for synchronizing the operation of two independently driven machines according to claim 7 wherein the cam closes and opens the pair of cam operated contacts twice during each revolution of the cam driving machine.

9. A system for synchronizing the operation of two independently driven machines according to claim 6 wherein is further provided an anode circuit relay having a solenoid interposed in the anode circuit of the tube and at least one pair of normally closed contacts which are transferred by the energizing of the solenoid, the pair of normally closed contacts being interposed in the energizing circuit of the reversing relay so that the cyclic transferring of the contacts of the reversing relay by the operation of the drop back cam is interrupted by the energizing of the solenoid of the anode circuit relay when the tube conducts.

10. A system for synchronizing the operation of two independently driven machines according to claim 9 wherein the anode circuit relay is provided with an auxiliary solenoid which is energized through a pair of normally open holding contacts so that the relay does not fall out when the flow of current through the tube is interrupted.

11. A system for synchronizing the operation of two independently driven machines according to claim 9 wherein is further provided signalling means which is connected in the tube anode circuit in parallel with the operating solenoid of the anode circuit relay thereby to give an indication of the flow of current through the tube when there is no relative mechanical phase difference between the machines.

12. A system for synchronizing the operation of two independently driven machines according to claim 11 wherein the signaling means includes a neon lamp.

13. A system for synchronizing the operation of two independently driven machines according to claim 6 wherein each of the generators includes two slip rings which connect its output terminals with the respective ends of its rotor winding, and means for periodically connecting one slip ring of each generator in a circuit which impresses the potential difference between the rings upon the control electrode of the tube when the generator rotors are in the same mechanical phase relationship.

14. A system for synchronizing the operation of two independently driven machines according to claim 13 wherein the means for connecting the generator slip rings in the circuit which impresses the potential upon the control electrode of the tube includes a conducting member carried respectively by the rotor of each generator so as to rotate conjointly therewith, each member being electrically interconnected with one correlated slip ring of a respective generator, and a relatively stationary member for periodically making electrical contact with each of the conducting members respectively, the members being positioned to contact simultaneously their respective stationary members when the generator rotors are in the same mechanical phase relationship thereby to impress the potential difference between the respective slip rings upon the control electrode of the tube.

15. A system for synchronizing the operation of two independently driven machines according to claim 14 wherein the conducting members are connected to their respective slip rings and relatively positioned so that a maximum positive peak potential appears on one member and a negative peak potential appears on the other member when the rotors are in the same mechanical phase relationship thereby to impress a maximum potential upon the tube control electrode in one position of the reversing relay contacts wherein the generator rotors are connected in parallel, no voltage being impressed thereupon in the other position of the contacts wherein the generator rotors are connected in series to short circuit the conducting members.

16. A system for synchronizing the operation of two independently driven machines according to claim 15 wherein a direct biasing potential is applied between the control electrode and cathode of the tube so that the control electrode is relatively negative with respect to the cathode and the tube is normally cut-off.

17. A system for synchronizing the operation of two independently driven machines according to claim 16 wherein the maximum peak voltage across the conducting members when the generator rotors are in the same phase relationship is greater in magnitude to the biasing potential so that the tube control electrode is made positive with respect to the cathode when the maximum peak voltage is applied thereto.

18. A system for synchronizing the operation of two independently driven machines according to claim 17 wherein is provided a resistor one end of which is connected to the tube cathode, a direct power supply the positive terminal of which is connected to the other end of the resistor, the negative power supply terminal connecting with the tube control electrode normally to bias the tube beyond cut-off, the maximum peak voltage from the conducting members being impressed directly across the resistor, the magnitude of the peak voltage being greater than that of the direct power supply whereby the tube cathode is made relatively more negative than the control electrode so that the tube conducts.

19. A system for synchronizing the operation of two independently driven machines according to claim 15 wherein is further provided a check impulse cam which is driven by one of the machines and a pair of contacts closed periodically by the cam, the contacts being interposed in the circuit which impress maximum peak potential from the conducting members upon the tube control electrode so that the circuit is completed to cause the tube to conduct only during the periods when the contacts are closed by the cam.

20. A system for synchronizing the operation of two independently driven machines according to claim 19 wherein the contacts are closed twice by the check impulse cam during each revolution of the driving machine.

21. A system for synchronizing the operation of two independently driven machines according to claim 6 wherein are further provided two rough check cams which are driven respectively by the two machines each of the cams operating correlated contacts, the contacts being connected to open the anode circuit of the tube unless both switches are closed substantially simultaneously by their correlated cams.

22. A system for synchronizing the operation of two independently driven machines according to claim 21 wherein there is provided a rough check relay having a solenoid connected in series with the rough check contacts and a pair of normally open contacts which are closed by the energizing of the solenoid, the normally open contacts being interposed in the anode circuit of the tube so that the tube conducts only upon the overlapping of the intervals during which the respective rough check cam contacts are closed.

23. A system for synchronizing the operation of two independently driven machines according to claim 22 wherein the rough check relay is provided with a holding circuit which parallels the rough check cam contacts, said holding circuit including contacts which open periodically to drop out the rough check relay if the intervals during which the rough check cam contacts are closed do not overlap.

24. A system for synchronizing the operation of two independently driven machines according to claim 23 wherein a check drop out cam driven by one of the machines opens the holding circuit contacts once during each revolution of the machine.

25. A system for synchronizing the operation of two independently driven machines according to claim 24 wherein is further provided a holding relay which is energized when current flows in the anode circuit of the tube, the holding relay having normally closed contacts which are connected in parallel with the contacts operated by the check drop out cam so that the holding circuit for the rough check relay cannot be interrupted by the latter contacts until the machines are in the same phase relationship and the resulting conducting of the tube has occurred.

References Cited in the file of this patent

UNITED STATES PATENTS 2,130,866     Wolters _____ Sept. 20, 1938